Patented Apr. 28, 1936

2,038,726

UNITED STATES PATENT OFFICE 2,038,726

BARIUM CROWN GLASS

Frederick Gelstharp, Tarentum, Pa., assignor to Pittsburgh Plate Glass Company, a corporation of Pennsylvania No Drawing. Application February 19, 1934, Serial No. 711,907

5 Claims. (Cl. 106—36.1)

The invention relates to barium crown glass designed for optical purposes and particularly for the production of bifocal ophthalmic lenses in which the reciprocal of dispersion must be at least approximately 45, together with a high index of refraction. The invention has for its objects the provision of an improved glass of the character specified which shall be free from devitrification or crystallization, and at the same time shall be resistant to atmospheric attack, known in the optical trade as "tarnish".

I have found that by using tin in a barium crown batch, the resistance to tarnishing due to the action of the atmosphere will be greatly increased. The amount of tin oxide ($SnO_2$) in the finished glass is preferably about 2½ per cent, but the amount may vary considerably, and may be as low as 1 per cent or as high as 10 per cent.

Following is an example of a batch which may be employed:

| | Pounds |
|---|---|
| Sand | 1000 |
| Barium carbonate | 940 |
| Soda ash | 192 |
| Calcium carbonate | 214 |
| Boric acid | 200 |
| Lead oxide | 172 |
| Zinc oxide | 47 |
| Sodium nitrate | 50 |
| Antimony oxide | 75 |
| Tin oxide | 60 |

One analysis of the glass produced is as follows:

| | |
|---|---|
| $SiO_2$ | 41.09 |
| $BaO$ | 30.00 |
| $Na_2O$ | 5.18 |
| $CaO$ | 4.83 |
| $B_2O_3$ | 4.65 |
| $PbO$ | 6.78 |
| $ZnO$ | 1.93 |
| $Sb_2O_3$ | 3.08 |
| $SnO_2$ | 2.46 |

The glass of the foregoing example has a reciprocal of dispersion of approximately 50, and an index of refraction of 1.616.

I am aware that the use of stannic compounds in glass is not broadly new, as instanced in Letters Patent granted to Walter H. Rising No. 1,737,685 and 1,737,686, but in such cases, the tin oxide has been used as a reducing agent and as a colorizer, and in such cases, the glasses are not barium crown glass and the purpose of the tin oxide is entirely foreign to the present invention which relates to a specific improvement in barium crown glass by the use of a relatively small percentage of the tin oxide to increase its resistance to tarnishing without adversely affecting the glass for the intended use in other respects. No claim is made, therefore, to the use of tin oxide other than in the particular barium crown optical glass described and claimed herein employing the limited quantity of the oxide described and claimed for the purpose set forth in the specification.

What I claim is:

1. A barium crown optical glass which would normally be subject to tarnishing containing sufficient tin oxide to render the glass resistant to tarnishing.

2. A barium crown optical glass which would normally be subject to tarnishing containing from 1 per cent to 5 per cent of tin oxide.

3. A barium crown optical glass which would normally be subject to tarnishing containing in excess of 20 per cent of barium oxide and 1 to 5 per cent of tin oxide.

4. A barium crown optical glass which would normally be subject to tarnishing containing from 1 to 5 per cent of tin oxide and having a reciprocal dispersion in excess of 45.

5. A barium crown glass having a refractive index in excess of 1.6 and a reciprocal of dispersion in excess of 45, and including a sufficient amount of tin oxide to render the glass resistant to tarnishing.

FREDERICK GELSTHARP.